UNITED STATES PATENT OFFICE 2,421,714

DIALKYLAMINOALKYL BENZHYDRYL ETHERS AND SALTS THEREOF

George Rieveschl, Jr., Grosse Pointe Woods, Mich., assignor to Parke, Davis & Company, Detroit, Mich., a corporation of Michigan No Drawing. Application April 18, 1944, Serial No. 531,639

11 Claims. (Cl. 260—570)

The invention relates to a new class of chemical compounds of therapeutic value. The compounds may be represented by the following general formula

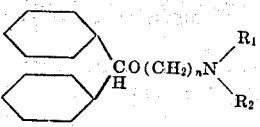

where $n$ is an integer 2 to 6 and $R_1$ and $R_2$ are each alkyl groups containing not more than 4 carbon atoms. The compounds of this invention may each be obtained as a free base having the formula given above or may be obtained in the form of acid addition salts of an acid of formula HX where X is the anion of an inorganic or organic acid as hereinafter more fully described.

Among the new compounds of my invention are the following typical examples, the formulae indicated being for the free base.

1. 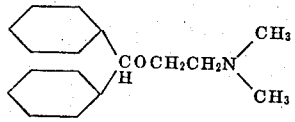

2. 

3. 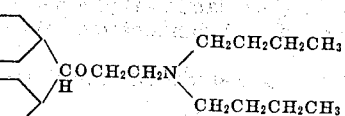

4. 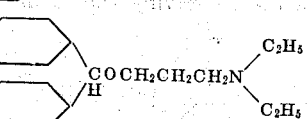

My invention may be further illustrated by the following examples for the preparation of the new compounds.

Example 1.—Preparation of β-dimethylaminoethyl benzhydryl ether hydrochloride (Compound 1)

(a) Benzhydryl bromide is first prepared as follows:

840 parts by weight of diphenylmethane is heated to 130° C. with stirring. In the presence of a 200 watt electric light 6 inches from the flask, 880 parts of bromine is added slowly. Liberation of HBr occurs and addition requires 1 hour and 45 minutes. The temperature is maintained at 130° C. for an additional 30 minutes. A fine stream of air is blown in to remove HBr and $Br_2$ while the reaction mixture cools. Benzene (180 parts) is added and the solution used immediately under (b) below.

If pure benzhydryl bromide is desired the above reaction mixture is dissolved in ether, washed with water, sodium carbonate solution and finally with water. The ether is removed, benzene added and distilled off and the benzhydryl bromide distilled in vacuo. Yield 85%.

(b) 490 parts β-dimethylaminoethanol and 530 parts of anhydrous sodium carbonate are heated to 110° C. with stirring. The addition of the benzene-benzhydryl bromide mixture is then begun. The temperature is raised to 120–125° C. As reaction takes place carbon dioxide is evolved, the addition requires 1½ hours. The mixture is kept at 125° C. for 5 hours additional time. After cooling, 3000 parts of water is added and the mixture stirred until the inorganic salts are dissolved. The mixture is transferred to a large separating funnel and 1500 parts of ether added. The ether solution is washed several times with water and then the ether layer extracted with 1 to 4 hydrochloric acid. The acid solution is treated with 30 parts of Darco and 30 parts Filter-Cel and filtered. The free base is liberated from the acid solution with 20% sodium hydroxide solution and taken up in ether. The ether layer is washed with water, saturated with NaCl and then shaken with solid potassium hydroxide. The ether is removed by distillation, 200 parts of benzene added and distilled off. The residue is distilled in vacuo and the fraction 150–165° C./2 mm. is collected and amounts to 433 parts. The hydrochloride salt is prepared by dissolving the free base in anhydrous ether and slowly adding an alcoholic solution of hydrogen chloride. The solid is recrystallized from absolute alcohol-ether mixture or isopropanol-ether mixture and has a M. P. of 161–162° C.

(c) In place of β-dimethylaminoethanol, the process may be carried out with other amino alcohols thereby obtaining compounds of the type hereinbefore listed. For example, the following amino alcohols may be used:

β-Diethylaminoethanol
γ-Diethylaminopropanol
β-Diethylaminopropanol
γ-Di-n-butyl ethanol

Example 2.—Preparation of β-diethylaminoethyl benzhydryl ether hydrochloride (Compound 2)

23.4 parts by weight of β-diethylaminoethanol, 9.2 parts sodium and 200 parts dry xylene are refluxed and stirred for 8 hours. Excess sodium is removed and 49.4 parts benzhydryl bromide added and refluxed for 2 hours. Water is added to dissolve salts and any unreacted β-diethylaminoethanol. The xylene solution is dried and distilled. The free base boils at 199–202°/11 mm. Yield 16.4 parts. The hydrochloride is precipitated with hydrogen chloride for an ether solution of the free base and has a M. P. of 145° C.

The process may be carried out with potassium instead of sodium and in place of β-diethylaminoethanol, any of the other amino alcohols required to obtain the other compounds of the invention may be used, such for example as β-dimethylaminoethanol, etc.

While the above examples have indicated the method of obtaining the hydrochlorides from the various free base compounds, it is to be understood that my invention contemplates other salts as well, such as sulfates, phosphates, cinnamates, tartrates, ascorbates, sulfamates and other organic and inorganic salts. These may be prepared from the free base in a manner known to the art. For example, the sulfamate and phenylacetate of $(C_6H_5)_2CHOCH_2CH_2N(CH_3)_2$ have been prepared. They are non-crystallizable oils which are soluble in water and alcohol, but insoluble in ether, ligroin and benzene.

The compounds of my invention are potent anti-histamine agents as revealed by their ability to alleviate the severe bronchioconstriction in guinea pigs induced by histamine administration. The compounds are extremely active in preventing anaphylactic shock in sensitized guinea pigs. In vitro experiments with guinea pig ileal muscle suspended in Tyrodis solution, prove that these compounds are remarkably active in preventing smooth muscle spasm induced by such agents as histamine, acetyl choline and barium chloride.

The compounds also inhibit gastric secretion in dogs either with histamine stimulus or meal stimulus.

The compounds may be administered to humans as the hydrochloride or other salts or the free bases. They may be given orally, parenterally, rectally or as a vapor or mist. The more active compounds of the invention, such as Compound 1, are indicated for therapeutic use in humans for allergic conditions (asthma, urticaria, histamine cephalgia, anaphylactic shock), smooth muscle spasm (biliary spasm, dysmenorrhea).

Compound 1 may be orally administered in dosage of 5 grains and given intravenously in amount of 150 mg.

The compounds of my invention may be prepared by several different processes and Examples 1 and 2 above are specific illustrations of certain of such processes. Some of the novel features of the various processes are disclosed and claimed in my copending applications, Serial Nos. 688,420, 688,421, 688,422 and 688,423, all filed August 5, 1946.

Attention is also called to the fact that compounds somewhat related to those claimed herein are described and claimed in my copending applications as follows: Serial No. 640,685, filed January 11, 1946; Serial No. 640,686, filed January 11, 1946; Serial No. 640,687, filed January 11, 1946; Serial No. 660,406, filed April 8, 1946; Serial No. 688,424, filed August 5, 1946; Serial No. 688,425, filed August 5, 1946; Serial No. 688,426, filed August 5, 1946; Serial No. 688,427, filed August 5, 1946; and Serial No. 739,985, filed April 8, 1947.

What I claim as my invention is:

1. A compound of the class consisting of a free base and its salts, said free base having the formula

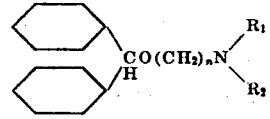

where $n$ is an integer from 2 to 6 and $R_1$ and $R_2$ are each alkyl containing not more than four carbon atoms.

2. A compound having the formula

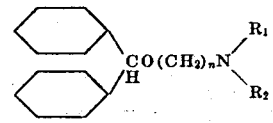

where $n$ is an integer from 2 to 6 and $R_1$ and $R_2$ are each alkyl containing not more than four carbon atoms.

3. A salt of a compound having the following formula for the free base

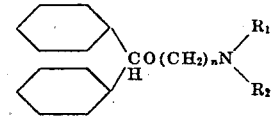

where $n$ is an integer from 2 to 6 and $R_1$ and $R_2$ are each alkyl containing not more than four carbon atoms.

4. The hydrochloride salt of a compound having the following formula for the free base

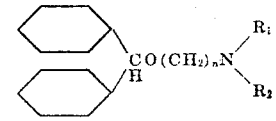

where $n$ is an integer from 2 to 6 and $R_1$ and $R_2$ are each alkyl containing not more than four carbon atoms.

5. β-dimethylaminoethyl benzhydryl ether hydrochloride.

6. Beta-diethylaminoethyl ether of benzhydrol.

7. Beta-dimethylaminoethyl ether of benzhydrol.

8. A salt of β-dimethyl aminoethyl benzhydryl ether.

9. A compound having the formula

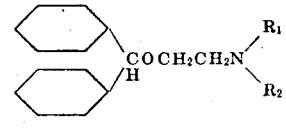

where $R_1$ and $R_2$ are each alkyl containing not more than four carbon atoms.

10. A salt of a compound having the following formula for the free base

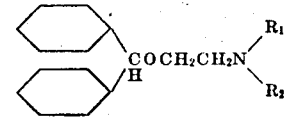

where $R_1$ and $R_2$ are each alkyl containing not more than four carbon atoms.

11. The hydrochloride salt of a compound having the following formula for the free base

where $R_1$ and $R_2$ are each alkyl containing not more than four carbon atoms.

GEORGE RIEVESCHL, JR.

REFERENCES CITED

The following references are of record in the file of this patent:

UNITED STATES PATENTS

| Number | Name | Date |
|---|---|---|
| 2,287,464 | Rock | June 23, 1942 |
| 2,316,625 | Rothenburg | Apr. 13, 1943 |
| 2,397,799 | Martin et al. | Apr. 2, 1946 |

OTHER REFERENCES

Levene, J. Biol. Chem., vol. 113.
Chemical Abstracts, vol. 36, p. 1928, April 1942.
Chemical Abstracts, vol. 35, pp. 8099–8100, 1941.
Chemical Abstracts, vol. 31, p. 3988, 1937.
Chemical Abstracts, vol. 30, p. 6706, 1937.
Chemical Abstracts, vol. 20, p. 2392, 1926.

Certificate of Correction

Patent No. 2,421,714.  June 3, 1947.

GEORGE RIEVESCHL, JR.

It is hereby certified that error appears in the printed specification of the above numbered patent requiring correction as follows: Column 2, line 55, for "$\gamma$-Di-n-butyl" read $\beta$-Di-n-butyl; and that the said Letters Patent should be read with this correction therein that the same may conform to the record of the case in the Patent Office.

Signed and sealed this 15th day of July, A. D. 1947.

[SEAL]

LESLIE FRAZER,
*First Assistant Commissioner of Patents.*